US012696207B2

(12) United States Patent
Niiranen et al.

(10) Patent No.: US 12,696,207 B2
(45) Date of Patent: Jul. 28, 2026

(54) TIMING ACCURACY OF ONE OR MORE RADIO DATA PACKETS

(71) Applicant: Siemens Industry Software Inc., Plano, TX (US)

(72) Inventors: Miika Niiranen, Pirkkala (FI); Sakari Ollitervo, Martinniemi (FI)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/872,830

(22) PCT Filed: Jun. 8, 2022

(86) PCT No.: PCT/IB2022/055331
§ 371 (c)(1),
(2) Date: Dec. 8, 2024

(87) PCT Pub. No.: WO2023/237909
PCT Pub. Date: Dec. 14, 2023

(65) Prior Publication Data
US 2026/0012902 A1 Jan. 8, 2026

(51) Int. Cl.
*H04J 3/06* (2006.01)
*H04W 56/00* (2009.01)

(52) U.S. Cl.
CPC ................................. *H04W 56/001* (2013.01)

(58) Field of Classification Search
CPC ...... H04L 43/50; H04L 47/28; H04W 88/085; H04W 24/00; H04W 56/00; H04J 3/14
(Continued)

(56) References Cited

U.S. PATENT DOCUMENTS 9,001,688 B2 * 4/2015 Dragulescu ............. H04L 47/11
370/252
10,326,540 B2 * 6/2019 Olgaard ................. H04B 17/29
(Continued)

FOREIGN PATENT DOCUMENTS

WO 2021126147 A1 6/2021
WO 2022046097 A1 3/2022

OTHER PUBLICATIONS

Alliance, O. R. A. N. "O-RAN working group 4 (open fronthaul interfaces wg) control, user and synchronization plane specification." O-RAN WG 4 CUS, (Nov. 22, 2021), pp. 1-318.
(Continued)

*Primary Examiner* — Marceau Milord
(74) *Attorney, Agent, or Firm* — Lempia Summerfield Katz LLC

(57) ABSTRACT

A method for determining timing accuracy of one or more radio data packets includes recording, by a test device, a reference time for one or more radio data packets received at an antenna interface of first radio equipment. The method includes generating, by the test device, a time window based on the reference time, and transmitting, by the first radio equipment, the one or more data packets to second radio equipment. The method includes recording, by the test device, an arrival time at which the one or more radio data packets are received by the second radio equipment, and comparing, by the test device, the arrival time with the time window, such that timing accuracy of the one or more radio data packets is determined.

11 Claims, 9 Drawing Sheets

(58) Field of Classification Search
USPC ......................................................... 370/350
See application file for complete search history.

(56) References Cited

U.S. PATENT DOCUMENTS

| | | | | | |
|---|---|---|---|---|---|
| 10,361,797 | B1 * | 7/2019 | Spitschka | .......... | H04B 17/0085 |
| 10,852,440 | B2 * | 12/2020 | Pieroni | ................ | H04B 10/293 |
| 11,796,621 | B2 * | 10/2023 | Chaudhary | .......... | G01R 35/005 |
| 11,802,903 | B2 * | 10/2023 | Sun | .................... | G01R 31/2844 |
| 12,335,758 | B2 * | 6/2025 | Kaszuk | ................... | H04L 43/50 |
| 2004/0068681 | A1 * | 4/2004 | Smith | ....................... | H04L 9/40 |
| | | | | | 714/43 |
| 2005/0135259 | A1 * | 6/2005 | Yazdi | ........................ | H04J 3/14 |
| | | | | | 370/241 |
| 2013/0028100 | A1 * | 1/2013 | Olgaard | .................... | H04L 1/24 |
| | | | | | 370/242 |
| 2014/0119421 | A1 * | 5/2014 | El-Hassan | .............. | H04B 17/29 |
| | | | | | 375/227 |
| 2014/0160961 | A1 * | 6/2014 | Dragulescu | ............. | H04L 43/50 |
| | | | | | 370/252 |
| 2014/0225635 | A1 * | 8/2014 | Dasnurkar | ....... | G01R 31/31726 |
| | | | | | 324/750.3 |
| 2016/0105810 | A1 * | 4/2016 | Khurana | ............... | H04W 24/06 |
| | | | | | 370/252 |
| 2017/0238335 | A1 * | 8/2017 | Checko | ............. | H04W 72/1273 |
| | | | | | 370/329 |
| 2018/0217265 | A1 * | 8/2018 | Pieroni | .................. | H04B 7/269 |
| 2018/0359170 | A1 * | 12/2018 | Olgaard | .................. | H04B 17/29 |
| 2019/0022981 | A1 * | 1/2019 | Labrot | .................... | G09F 3/203 |
| 2019/0187200 | A1 * | 6/2019 | Gondi | .................... | G01R 29/10 |
| 2019/0363806 | A1 * | 11/2019 | Glover | ................... | H04B 17/15 |
| 2023/0017470 | A1 * | 1/2023 | Niiranen | ............ | G01R 31/2844 |
| 2023/0046743 | A1 * | 2/2023 | Vaez-Ghaemi | .... | H04B 17/0085 |
| 2023/0231633 | A1 * | 7/2023 | Vierimaa | .......... | H04B 17/0087 |
| | | | | | 455/67.11 |
| 2023/0273778 | A1 * | 8/2023 | Vierimaa | ................. | G06F 8/41 |
| | | | | | 717/140 |
| 2024/0283692 | A1 * | 8/2024 | Skov | ................... | H04L 27/2666 |
| 2025/0350969 | A1 * | 11/2025 | Niiranen | ............. | H04B 17/104 |

OTHER PUBLICATIONS

PCT International Preliminary Report on Patentability mailed Aug. 20, 2024 corresponding to PCT International Application No. PCT/IB2022/055331.

PCT International Search Report and Written Opinion of International Searching Authority mailed Jan. 27, 2023 corresponding to PCT International Application No. PCT/IB2022/055331.

* cited by examiner

Transport Layer

FIG 9

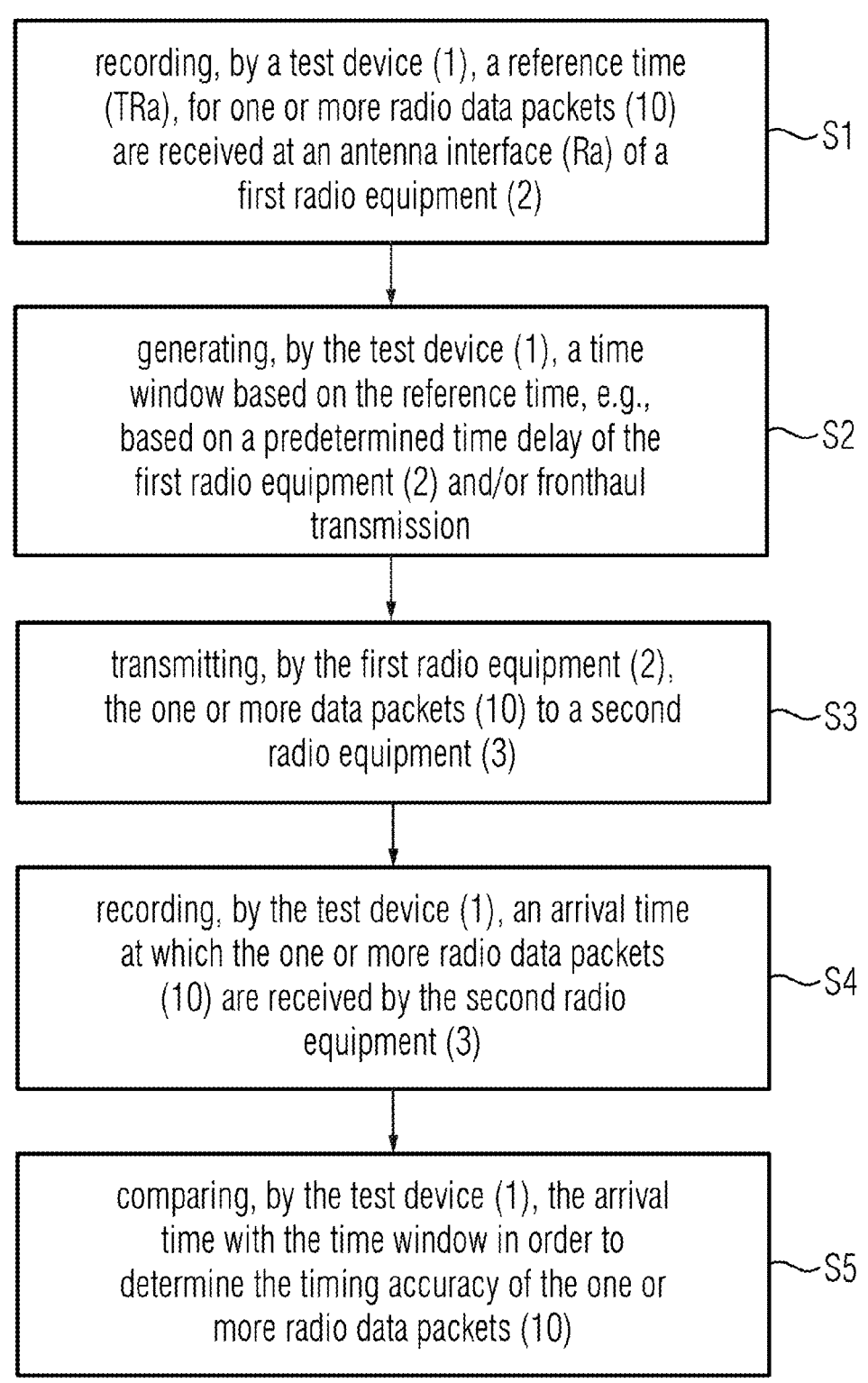

recording, by a test device (1), a reference time (TRa), for one or more radio data packets (10) are received at an antenna interface (Ra) of a first radio equipment (2) — S1 generating, by the test device (1), a time window based on the reference time, e.g., based on a predetermined time delay of the first radio equipment (2) and/or fronthaul transmission — S2 transmitting, by the first radio equipment (2), the one or more data packets (10) to a second radio equipment (3) — S3 recording, by the test device (1), an arrival time at which the one or more radio data packets (10) are received by the second radio equipment (3) — S4 comparing, by the test device (1), the arrival time with the time window in order to determine the timing accuracy of the one or more radio data packets (10) — S5

FIG 10

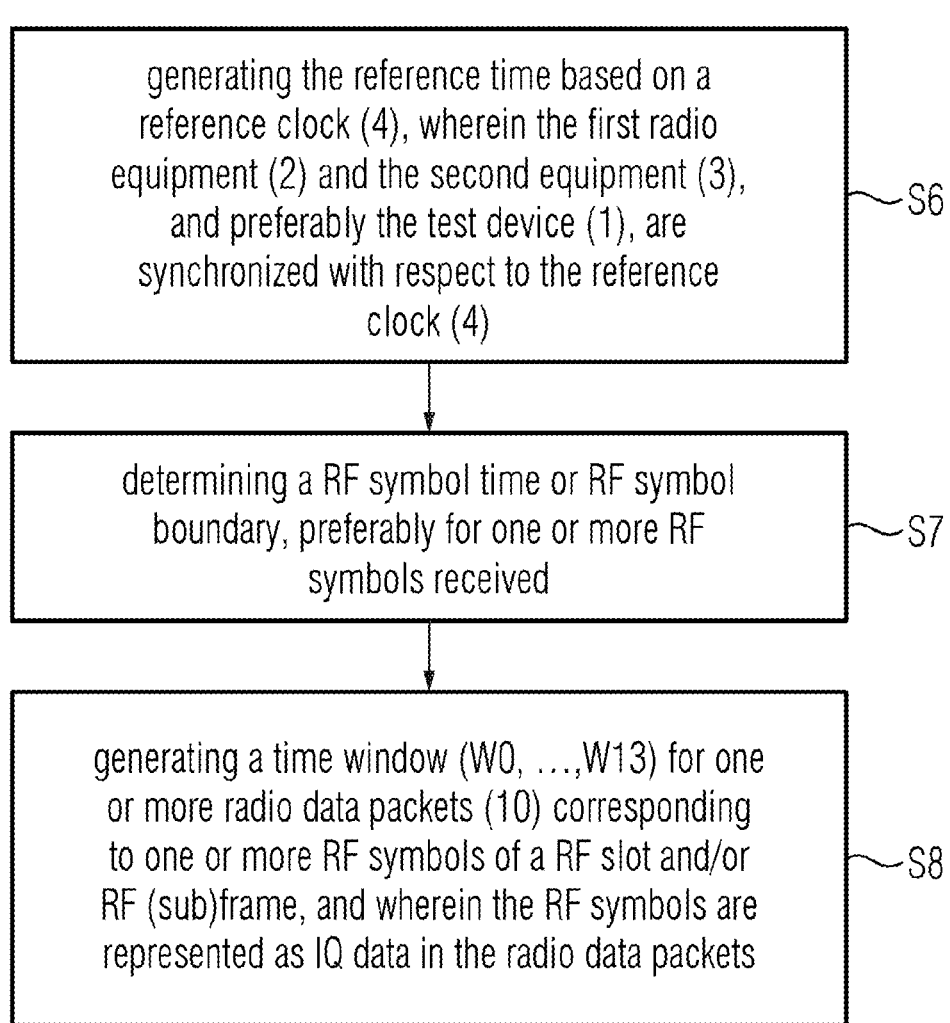

generating the reference time based on a reference clock (4), wherein the first radio equipment (2) and the second equipment (3), and preferably the test device (1), are synchronized with respect to the reference clock (4)          ~S6 determining a RF symbol time or RF symbol boundary, preferably for one or more RF symbols received          ~S7 generating a time window (W0, ...,W13) for one or more radio data packets (10) corresponding to one or more RF symbols of a RF slot and/or RF (sub)frame, and wherein the RF symbols are represented as IQ data in the radio data packets          ~S8

FIG 11

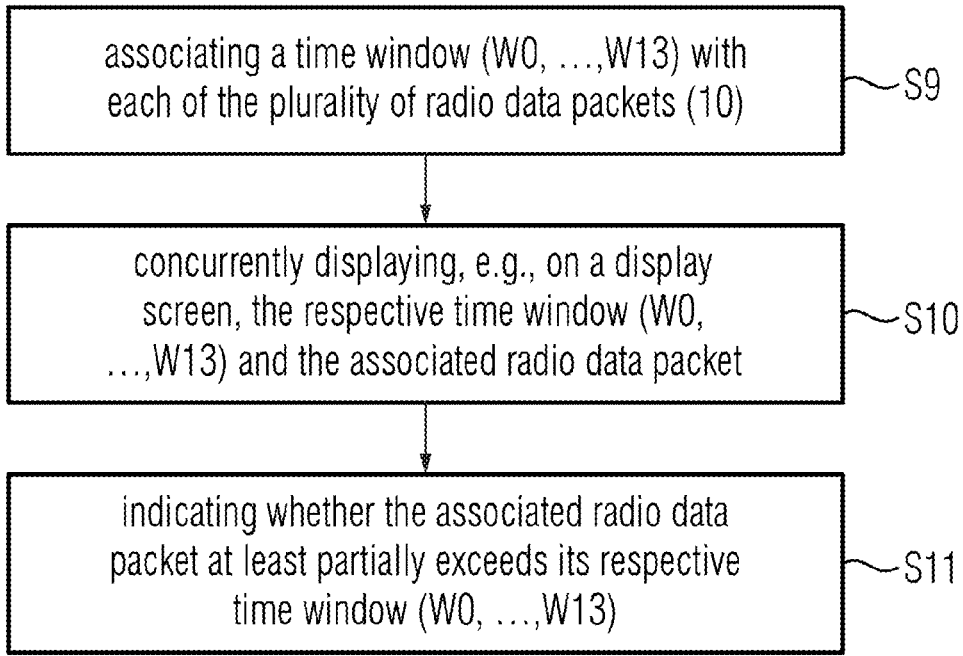

associating a time window (W0, ...,W13) with each of the plurality of radio data packets (10) — S9 concurrently displaying, e.g., on a display screen, the respective time window (W0, ...,W13) and the associated radio data packet — S10 indicating whether the associated radio data packet at least partially exceeds its respective time window (W0, ...,W13) — S11

FIG 12 successively arranging radio data packets in chronological or-der received at the antenna interface (Ra) and/or at the second radio equipment (3), and
concurrently displaying the time windows (W0, ...,W13) and the associated radio data packets (10) of at least one RF slot in a first view — S12

Figures 13, 14:
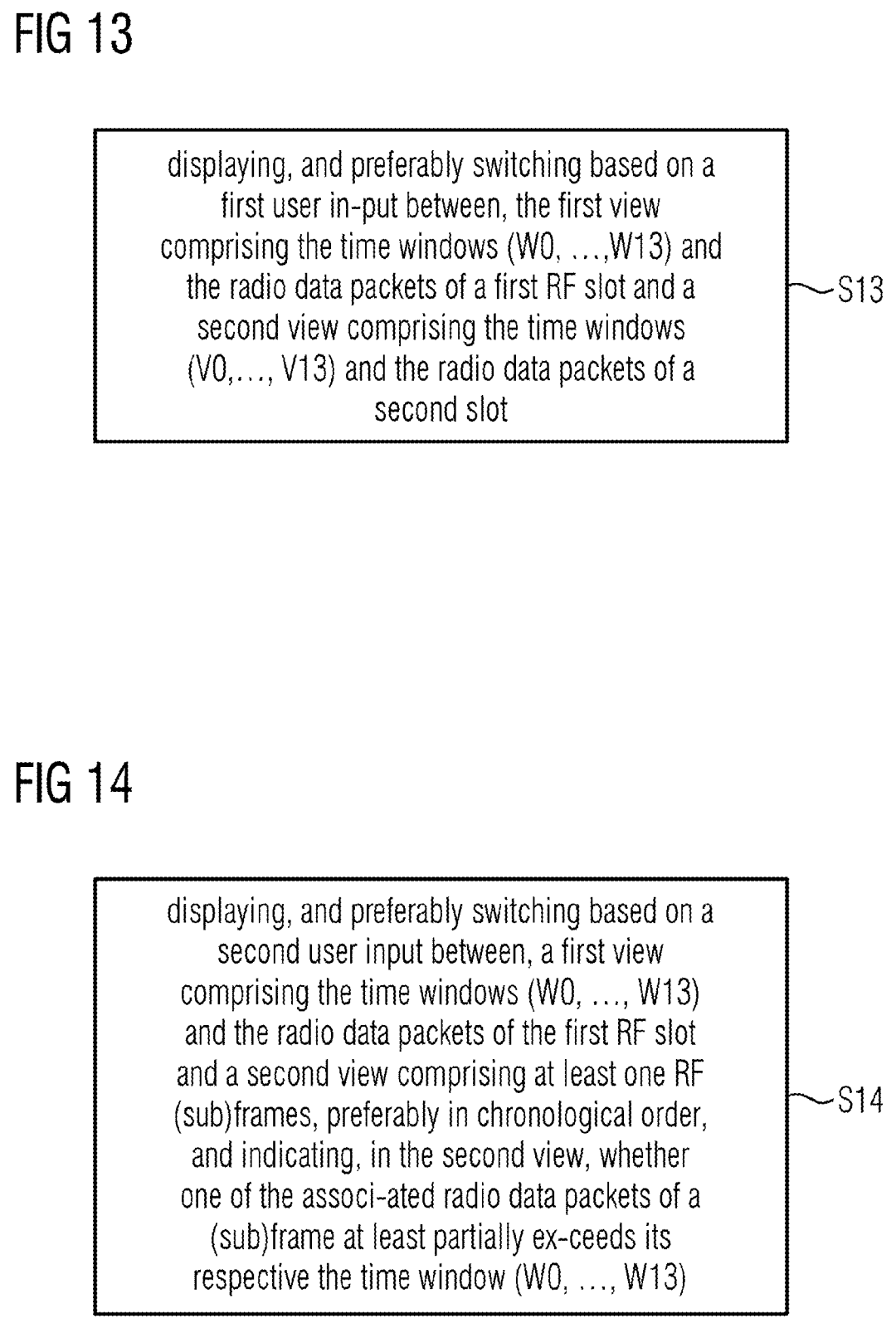

FIG 13 displaying, and preferably switching based on a
first user in-put between, the first view
comprising the time windows (W0, ...,W13) and
the radio data packets of a first RF slot and a
second view comprising the time windows
(V0,..., V13) and the radio data packets of a
second slot

~S13

FIG 14 displaying, and preferably switching based on a
second user input between, a first view
comprising the time windows (W0, ..., W13)
and the radio data packets of the first RF slot
and a second view comprising at least one RF
(sub)frames, preferably in chronological order,
and indicating, in the second view, whether
one of the associ-ated radio data packets of a
(sub)frame at least partially ex-ceeds its
respective the time window (W0, ..., W13)

~S14

TIMING ACCURACY OF ONE OR MORE RADIO DATA PACKETS

This application is the National Stage of International Application No. PCT/IB2022/055331, filed Jun. 8, 2022. The entire contents of this document are hereby incorporated herein by reference.

TECHNICAL FIELD

The present disclosure relates to the timing of one or more radio data packets. In particular, the disclosure relates to transmission and/or reception of the radio data packets over a fronthaul network. More particularly, the disclosure relates to testing of radio equipment.

BACKGROUND

In a fronthaul of a radio network, antenna data is to be carried over longer distances. Therefore, strict throughput latency, jitter, timing, and synchronization requirements are to be respected. Hence, the transmission over the fronthaul is to have a strict synchronization and timing mechanism, such as Precision time Protocol (PTP) (e.g., between the radio unit, RU, and the baseband unit, BBU) to provide appropriate transmission and/or reception of data packets.

To provide compliant frame synchronization, the proper functioning of radio equipment of a radio network is to be verified. Testing of the radio equipment is to be performed. For example, a test device may also act as a PTP master and provide that O-RAN messages are played honoring specified timestamps, enabling testing of required timing windows.

SUMMARY AND DESCRIPTION

The scope of the present invention is defined solely by the appended claims and is not affected to any degree by the statements within this summary.

The present embodiments may obviate one or more of the drawbacks or limitations in the related art. For example, examination and verification of transmission and/or reception of data packets over the fronthaul with respect to timing is improved.

BRIEF DESCRIPTION OF THE DRAWINGS

FIGS. 9 to 15 show example acts according to a plurality of embodiments.

DETAILED DESCRIPTION

Figure 1:
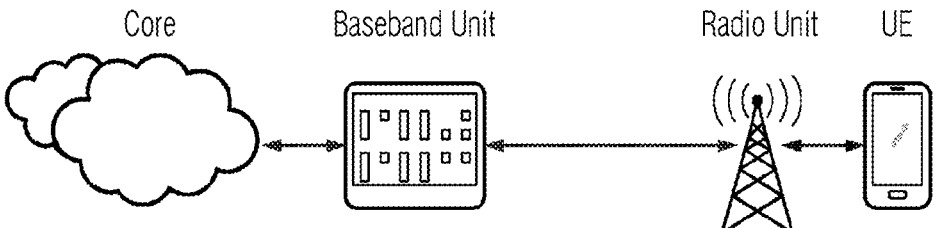
FIG. 1 shows an illustration of a radio communication system.

In FIG. 1, a radio communication system is illustrated. The traditional monolithic base transceiver station (BTS)

architecture is increasingly being replaced by a distributed BTS architecture in which the functions of the BTS are separated into two physically separate units (e.g., a baseband unit (BBU) and a radio unit RU). The BBU performs baseband processing for the particular air interface that is being used to wirelessly communicate over one or more radio frequency channels. The RU performs radio frequency processing to convert baseband data output from the BBU to radio frequency signals for radiating from one or more antennas coupled to the RU and/or to produce baseband data for the BBU from radio frequency signals that are received at the RU via one or more antennas. The RU is typically installed near the one or more antennas, often at the top of a tower, and the BBU is typically installed in a more accessible location, often at the bottom of the tower. However, RU and BBU may be collocated (e.g., in a lab). The BBU and the RU may be connected through one or more fiber optic links. The interface between the BBU and the RU is defined by fronthaul communication link standards such as the Common Public Radio Interface (CPRI) or Enhanced Common Public Radio Interface (eCPRI) family of specifications, the Open Base Station Architecture Initiative (OB-SAI) family of specifications, and the Open Radio Interface (ORI) family of specifications.

In the 5G architecture, a new frequency domain fronthaul interface will be specified. The frequency domain fronthaul is a functional split where the IFFT/FFT (Inverse Fast Fourier Transform/Fast Fourier Transform) may be moved from the BBU to the RU. Frequency domain samples instead of time domain samples are sent over the fronthaul. The RU will have information through a communication channel about the resource allocation for different UEs. The new eCPRI interface specification "eCPRI Specification V1.0 (2017 Aug. 22)" is already available.

For the deployment scenario where the radio unit, RU, (sometimes also denoted as Radio Remote Unit, RRU or Remote Radio Head, RRH) and the baseband unit, BBU, (sometimes also denoted as radio equipment controller, REC, or Distributed Unit, DU) are separated, the signals received from one or more antennas are to be transported over the media that is connecting the RU with the BBU, as normally the signal combination is done at the BBU. In general, the interface that is used for the connection between the BBU and the RU is referred to as the fronthaul. The signals over the fronthaul may be complex time domain samples such as specified in the legacy Common Public Radio Interface, CPRI, or nowadays eCPRI. Digitized waveforms may be transported over the fronthaul from the BBU to the one or more RU, and vice versa, via one or more radio aggregation units (RAU). As illustrated, the BBU may be connected to a core network, Core, and possibly to other BBUs (not shown) via one or more backhaul or cross-haul connections. The one or more radio data packets may thus be transmitted over the fronthaul (e.g., between a radio unit and a baseband unit). A test device may be coupled to the radio unit and/or the baseband unit via the fronthaul, as will be discussed later. Hence, the one or more radio packets may be transmitted from the test device to the RU or BBU, or vice versa.

Signals of the user equipment, UE, are power limited, and as the path loss varies with the distance to the UE, a large dynamic range is encountered when those signals are represented digitally; it may be assumed that for the complex frequency sample, a large number of bits will be required, and in the case of multiple input multiple output (MIMO)/ diversity layers, the required fronthaul capacity will multiply with the number of antennas. Further, it is desired to model such propagation of radio signals in order to test the functionality of the radio system and its components. As the capacity on the fronthaul is limited it is desired to find methods that optimize and/or monitor the usage of the fronthaul.

High speed data services are always a target for operators, and there is a need for users, especially professionals. The quality of synchronization has a direct impact into the Quality of Service. In addition, for telecommunication system performance, the radio equipment needs good synchronization to achieve a suitable separation and avoid channel interference.

The open fronthaul interface linking ORAN-distributed unit (O-DU), corresponding to the baseband unit BBU, and ORAN radio unit (O-RU), includes 3 major planes to provide the reliable connection between a distributed unit and one or more radio unit. The S plane, known as synchronization plane, plays the role of synchronizing the distributed unit with radio unit with respect to time, phase, and/or frequency synchronization. Further, the management plane (M plane) is responsible for supporting FCAPS (Fault, Configuration, Accounting, Performance, Security) to the O-RU. Further, the control plane (C plane) and user plane (U plane) cover the data configuration and feature parameters and the actual radio data desired to be sent by the users (e.g., during operation and/or test).

In the uplink direction, the O-RU receives the wireless signal over antenna elements. The wireless signals (e.g., in the form of RF symbols, also denoted as RF signals) may then pass through an analog beamforming block, not shown, and/or an analog to digital converter block, not shown, whereupon the generated data is ready to be converted from time to frequency domain by the Fast Fourier transform (FFT) block, not shown. After, basic filtering and digital beamforming are performed in order to extract the actual data that may be compressed as IQ data. The IQ data may then be provided in the form of one or more radio data packets to be transmitted over the fronthaul.

Figure 2:
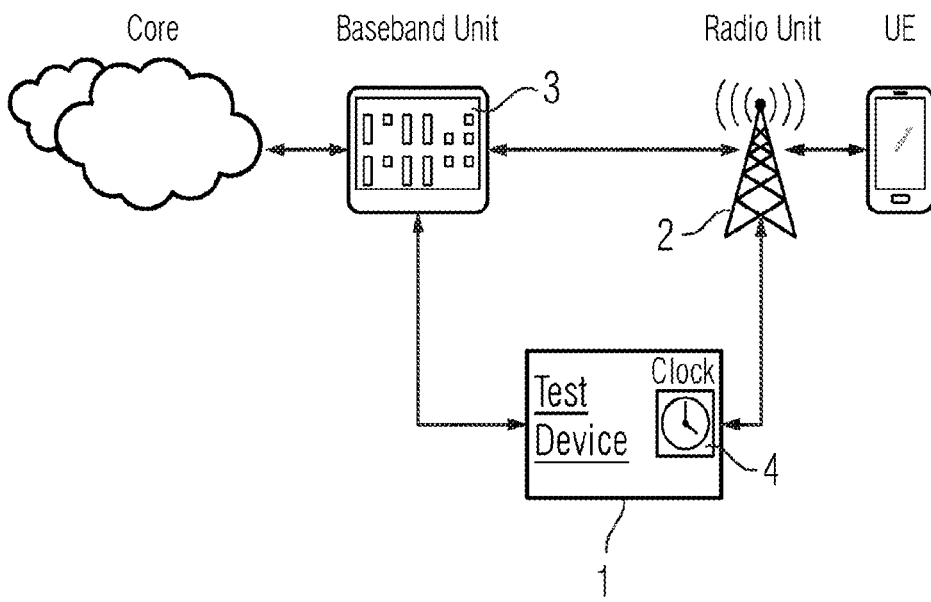
FIG. 2 shows an illustration of a test system including a test device coupled to a baseband unit and a radio unit.

FIG. 2 shows an illustration of a test system including a test device coupled to a baseband unit and a radio unit. In order to test the functionality of the baseband unit and/or the radio unit, a test device may be used that provides stimulus (e.g., in the form of one or more radio data packets) to the radio unit and/or the baseband unit. The test device 1 may additionally or alternatively store the data transmitted and/or received by the baseband unit and/or the radio unit. Thus, the test device may be used to test and/or to monitor and/or analyze the functioning of the baseband unit and/or the radio unit. For the purpose of synchronization, the test device may include or be coupled to a clock that provides a reference time for the test device, the baseband unit, and/or the radio unit.

Figure 3:
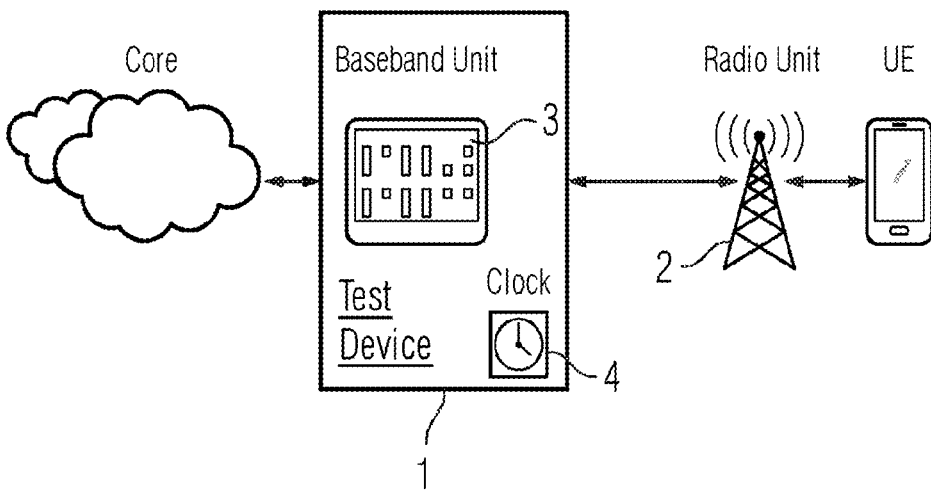
FIG. 3 shows an illustration of a test system including a test device, where the test device includes the functionality of the baseband unit.

FIG. 3 shows an illustration of a test system including a test device, where the test device includes the functionality of the baseband unit. The test device itself may include the functionality of the baseband unit (e.g., in order to test the radio unit). Again, the test device may include or be coupled to a clock providing a reference time for the synchronization of the transmission and/or reception of radio data packets between the baseband unit and the radio unit.

Neither a core network nor a UE need to present in the test system.

Figure 4:
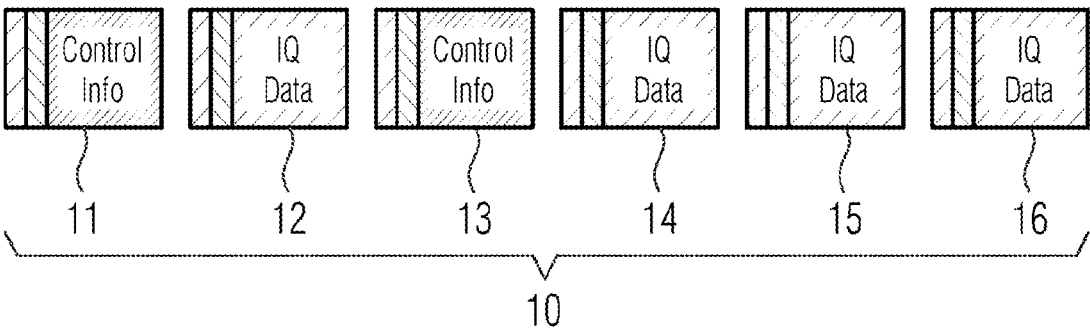
FIG. 4 shows an illustration of radio data packets.

FIG. 4 shows an illustration of radio data packets 11-16. For example, the control plane data, also referred to as C plane, is sent separately from the user plane data, also referred to as U plane. For the downlink case, C plane radio data packets 11, 13 are sent before the U plane radio data packets 12, 14, 15, 16 with a specific period of time that allows the O-RU to process and be ready for the next received U plane radio data packet, coming from the same source O-DU. This C plane data packet 11, 13 is sent again in the next slot. Depending on U plane characteristics and patterns, the C plane may be either the same copy or may be reconfigured. The C plane and the U plane radio data packets 11-16 may include data encapsulated using eCPRI or IEEE1914.3 mechanism. As shown in FIG. 4, the control information and the IQ data are preceded by IP and/or Ethernet header and a C plane header or a U Plane header, respectively, illustrated by the small boxes at the beginning of the data packets 11-16. The IQ data may be in the frequency domain. The control information radio data packets are sent always before the U plane data packets. Every slot C plane data packet precedes U plane radio data packet by a certain period of time defined by time management parameters known as T cp_adv_dl. This amount of time allows O-RU to update beamforming weights linked to the user data in a DL direction. Similarly, the C plane packet, in UL data flow, is used to adapt the processing of the O-RU for the U plane data coming to its antenna.

The U plane radio data packets may be separated into two parts. The first part defines the scheduling, beamforming commands information followed by the IQ data. The U plane data may actually exceed the maximum ORAN specified data packet size. In such cases, the data is split over multiple radio data packets. Data may be organized in many section types. Data that belongs to different sections may be sent separately. Whenever the IQ data are not achieving 1 byte alignment, stuffing bits are added at the end of a section.

Hence, when receiving an RF signal in the RU antenna (e.g., uplink direction), the radio unit will digitize data and wrap the data up into the (e)CPRI protocol (IQ data) going through, for example, an optical fiber, reaching the BBU and Backhaul afterward. Hence, an RF symbol may include one or more IQ samples that are provided in one or more radio data packets and, for example, transmitted via the fronthaul. In the downlink direction, the baseband unit sends user data to RU enveloped in (e)CPRI protocol. The user data may also be in the form of IQ data and present in the one or more radio data packets (e.g., transmitted over the fronthaul). The (e)CPRI frames will be unpacked, converted to analog signals, and then transmitted over the air as RF signals or symbols.

For example, a CPRI radio frame consists of a 10 ms time period. Therein, 256 basic frames, each basic frame if of 260 ns, constructs one hyper frame of period 66.7 μs. A collection of 150 hyper frame takes a shape of 10 ms frame which is the radio frame.

Figure 5:
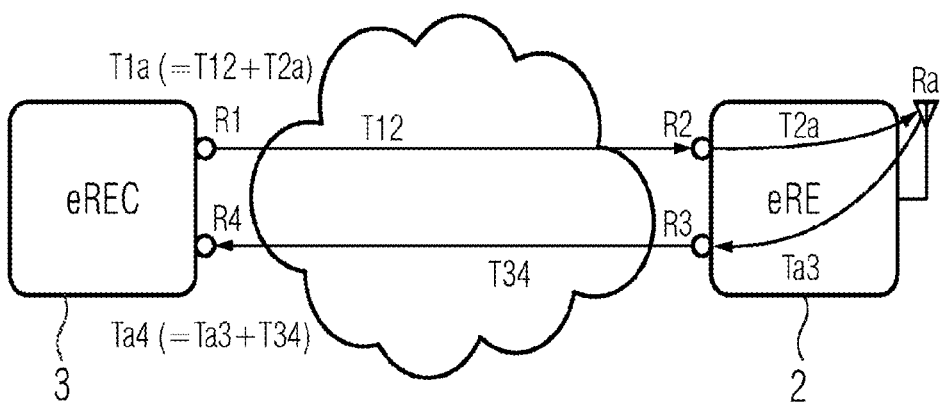
FIG. 5 shows an illustration of synchronization between a baseband unit and a radio unit.

As shown in FIG. 5, for example, in an eCPRI network, all nodes should be synchronized in different domains: frequency, time, and phase domain. Timing synchronization is required so that all nodes would be aligned to the same common time reference, known as the grandmaster clock, GM. The nodes may be a radio unit and a baseband unit as described previously. Radio unit and baseband unit are referred to in this embodiment as eRE and eREC, respectively. Both eRE and eREC may fulfill requirements set, for example, by 3GPP, related to timing accuracy of the fronthaul network. Indeed, eREC is relaxed compared to eRE, which requires a high-quality frequency synchronization. However, eREC has to send data to eRE at the correct time, so that there is enough time to process the data and transmit the data through the air interface, as well as buffer handling due to network latency variation.

As mentioned above, the synchronization plane deals with data flow for synchronization and timing information in the fronthaul (e.g., network). The grandmaster (GM) clock may be located either in the fronthaul network (e.g., outside base Station) or inside one of the eCPRI nodes (e.g., in the eREC). The GM clock acts as a reference clock of a PTP based network to synchronize all the nodes therein.

Typically, eREC and eRE are connected in the eCPRI based network. The reference point for timing management is always related to the input and output port of each node. For all fronthaul technology, the timing parameters are common. T12 represents the time delay caused by the medium or the fiber that links the output of eREC and eRE. T2$a$ is the time delay to process the data by eRE and transfer the data over the antenna Ra. Ta3 delay is for processing data coming from the antenna and transmitted to port R3. T34 is transport network delay of user data packets between the Rx output of the eRE and input of eREC. Finally, T1$a$ is the total time delay of user data starting from the eREC input port 1 until transmitting the IQ data over the eRE antenna. The same applies for Ta4 but in the opposite direction, where the data flow comes from antenna ends to R4 eREC input port.

After synchronization of the two eCPRI nodes, DL and UL, data transmission starts. Since different transmission methods exist in eCPRI, some amount of time is always required to transfer packets of data from eREC and eRE. As the IQ data transmitted over eCPRI is in the frequency domain, the RF symbol duration directly affects the amount of time needed for radio data packet transmission. In other words, all bandwidth, amount of data compression, and eRE data rate may affect the transmission time. Further, as the IQ data transmitted over the fronthaul (e.g., using eCPRI) is in the frequency domain, the RF symbol duration directly affect the amount of time needed for packet transmission. In other words, all bandwidth, amount of data compression, and eRE data rate may affect the transmission time over the fronthaul.

In the downlink direction, the following timing parameters are present: T12 transport network delay between port 1 and port 2. T12 may vary in an interval named transport variation. T12 is bounded with T12min and T12max. T12min is the minimum delay of the fastest path data may take to link the two nodes. T12max is the maximum end to end one-way delay. The User data will thus take a delay T12 such that: T12min<T12<T12max.

Figure 6:
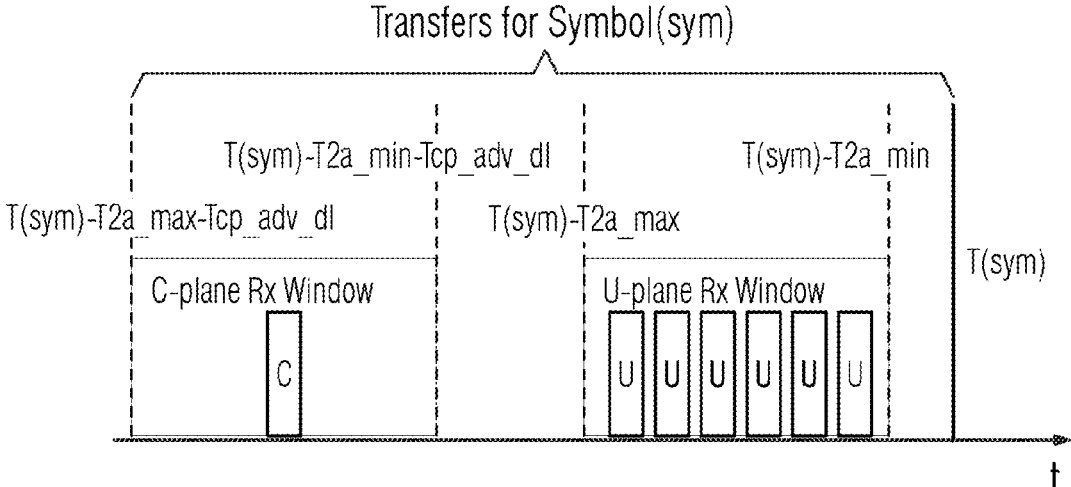
FIG. 6 shows a visualization of data packet transmission over the fronthaul.
Figure 7:
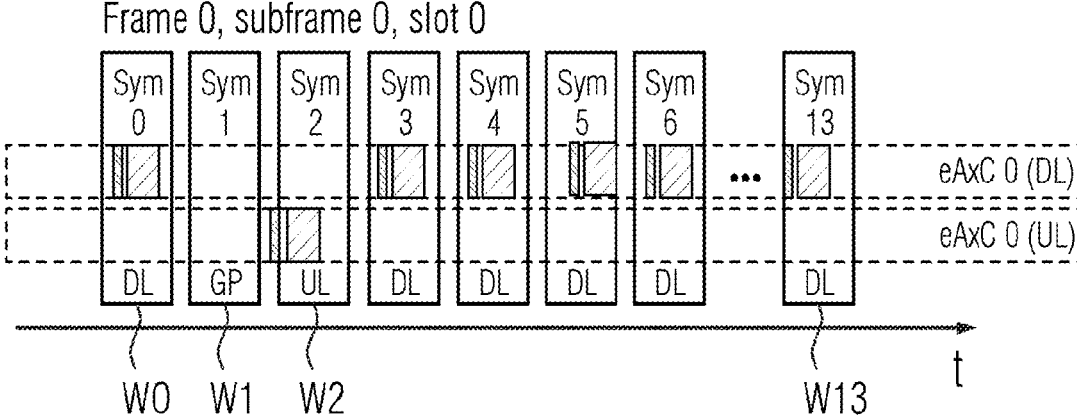
FIG. 7 shows an illustration of acceptable time windows and data packets of a first slot.

In FIG. 6, a visualization of radio data packet transmission over the fronthaul is shown. The visualization includes (C plane and U Plane) radio data packet transmission windows and the radio data packets themselves, as transmitted (in the C Plane and the U Plane) over the fronthaul.

For example, in the downlink, once the one or more data packets reach the RU where the one or more data packets should be processed, T2$a$ is the timing difference between the reception of user packets from radio unit Tx input port R2 to the transmission of IQ samples at the antenna port Ra. To compensate for the different T12 values, the radio unit is capable of buffering data, which implies that the T2$a$ timing values change depending on which path the data packets took to reach port R2. T2$a$ min is the minimum timing for the radio unit to process the data packets.

T1$a$ is the timing difference between the transmission of a radio data packet at the output point R1 of the eREC and the transmission of IQ samples at the antenna Ra of the eRE. The transmission of the earliest IQ sample that is generated from the transmitted radio data (e.g., in the one or more radio data packets) is the RF symbol time Tsym at the antenna Ra.

T2$a$ is the timing difference between the reception of a radio data packet at the input point R2 of eRE and the transmission of IQ samples at the antenna Ra (e.g., as one or more RF symbols). The transmission of the earliest IQ sample at the antenna is the RF symbol time Tsym. If a user data packet arrives outside of this reception window (e.g., earlier than T2$a$ max or later than T2$a$ min), the radio data packet may not be used, and consequently, IQ samples and thus RF symbols related to this radio data packet may not be generated correctly.

By looking at data packets' timestamps, it is difficult to determine when a packet should have been captured, or what was the acceptable window of time for the packet with respect to the relevant symbol time Tsym on the air interface. As mentioned, Tsym may thus be given as the time when a symbol air interface transmission starts, or, in the uplink case, when a symbol reception starts via the air interface.

As the respect for packet timings and the required Time Advance values is of the biggest concerns in getting O-RAN based fronthaul networks to work reliably, sufficient timing accuracy is required. It may also be required to provide efficient visualization to a test engineer in order to identify the possibility to identify the cause of a transmission error or delay.

For the timing analysis, a reference time (e.g., Tra) is saved or timestamped (e.g., when capturing the one or more data packets). The timestamp may be applied to the one or more radio data packets. The reference time TRa may be a 1 Hz (1 PPS) pulse from a clock, such as a GPS receiver or Grandmaster Clock in a test system (e.g., as described in the above). The symbol time Tsym may then be derived from the reference time TRa. For example, the symbol time Tsym may be derived from TRa by taking into account one or more system parameters, such as alpha and beta values according to 9.7.2 of ORA-WG4.CUS.0-v01.00, 2019 Mar. 11. For example, a system frame number may be calculated based on the GPS second. Thereby the system frame number, or radio frame number, and the start of a system frame, or radio frame, may be determined.

By recording (e.g., saving) this timing information (e.g., reference time Tra), the past and future RF symbol boundaries (e.g., Tsym) may be interpolated and/or extrapolated. Further, the specific Time Advance values (e.g., for the Control and/or User plane) may be taken into account, which enables determining time windows for the radio data packet transmission at the baseband unit (e.g., O-DU) or reception (e.g., at the radio unit, such as at the O-RU), depending on which end of the fronthaul (e.g., link) the radio data packet has been captured (e.g., whether the (O-RAN) Fronthaul latency (namely T12) may need to be taken into account or not).

Thus, one or more radio data packets may be split and, for example, visualized (e.g., on a horizontal time axis, on a RF slot basis, such as, slot wise). In other words, one or more radio data packets captured during a time period (e.g., of possibly several hundreds of radio frames (each having a duration of 10 ms)) may be determined and/or visualized as time windows (e.g., "deck of cards"), with each time window (e.g., "card") including an RF lot and/or corresponding to an acceptable time window (e.g., for each of the 14 or 12 RF symbols of a RF slot; for either normal or extended cyclic prefix, respectively). Each radio data packet (e.g., control and user-plane radio data packet) is aligned with the acceptable time window (e.g., reception time window) by adding the required time Advance value to its timestamp (e.g., the reference time or the symbol time derived from the reference time), as described in the above. In this way, correctly timed radio data packets may be shifted inside the acceptable time window, and too early or too late data packets fall out of the time window. Thereby, timing violations become evident. In addition, the positioning of the radio data packets is visualized, and a user is able to determine whether the radio data packets are received at the beginning, center, or end of the time window. By visualizing all radio data packets captured in the same view, users may easily see if delays are due to high link utilization or whether another problem exists. The "deck of cards" type of a RF slot split allows quick scanning thru the entirety of captured data packets. For example, a certain view using the visualization described may be centered around a RF slot, and by using input commands, such as up/down arrows or mouse scroll wheel, the user is able to view the time windows of a previous or the next RF slot and visually compare the time windows. Zooming closer to individual symbols may also be supported in order to allow a more detailed display of RF symbol timings and error magnitude.

Figure 8:
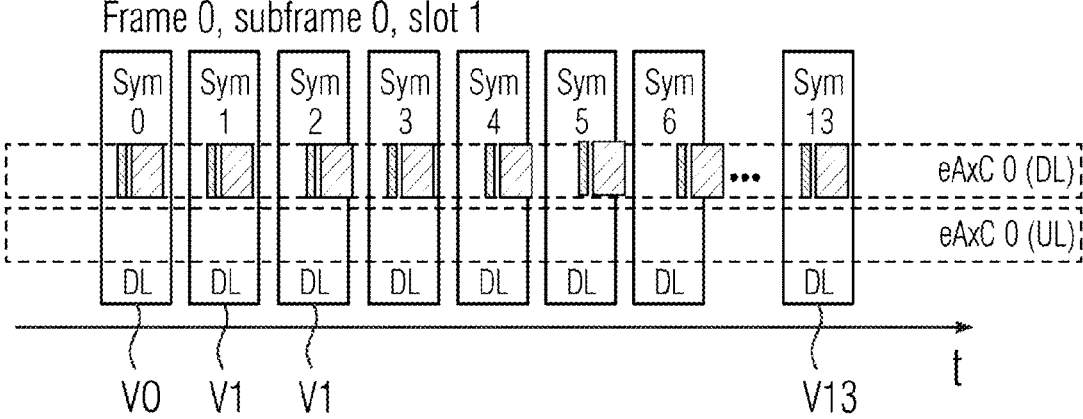
FIG. 8 shows an illustration of acceptable time windows and data packets of a second slot.

FIG. 8 shows an illustration of acceptable time windows and radio data packets of a first slot. In FIG. 8, a first slot (e.g., slot 0) along with the acceptable time windows (e.g., reception time windows) for each of its RF symbols (e.g., symbol 0 . . . 13) are shown as light blue/gray/green boxes spanning vertically across a plurality of antenna carriers. Antenna carriers are expanded into downlink (DL) and uplink (UL) directions, with radio data packets (e.g., control- and/or user-plane radio data packets) collapsed onto the same timeline. The sizes of the bars on the time axis reflect the sizes of the actual radio data packets (e.g., and to also show if a radio data packet end falls out of the (acceptable) time window, not just the radio data packet's start). RF symbols may be colored and/or marked according to their purpose, downlink, uplink, or guard period. Thereby, it may be visualized whether radio data packets arrive at totally wrong RF symbol times Turning to FIG. 9, an illustration of acceptable time windows and data packets of a second slot is shown. For example, by using the input commands such as the arrow down key or mouse scroll down, the visualization may be moved from one RF slot to another (e.g., to the next slot, such as slot 1). This slot shows "too late" radio data packets for symbols 4 . . . 6. The time violations are highlighted (e.g., using red color) for those radio data packets. In the "deck of cards" view, the whole RF slot may be marked accordingly (e.g., be colored in red), as well as the RF frame/subframe, if this RF subframe was collapsed and the RF slot 1 hidden from the view.

The view is positioned identically to the previously viewed RF slot (e.g., slot 0), allowing direct comparison of the RF symbol timings and the corresponding radio data packets between those two slots. If the zoom level was changed before, the same level may be maintained throughout different RF slots unless the user decides to change the zoom level again to view the full RF slot, an individual symbol, or something in between. The "deck of cards" arrangement allows for multiple RF slots to be "open" at the same time, and automatically resizes (e.g., collapses the slots furthest away of slot of interest) as the graphical user interface window/widget runs out of space. It is also possible to display RF subframes and/or frames so that the user may quickly navigate to the next 10 ms frame or 1 ms subframe, without having to scroll thru each and every RF slot to get there. RF stands for radio frequency in order to identify the corresponding RF character of symbol, slot, and/or (sub) frame, and not to mistake it with the fronthaul protocol frame (e.g. of (e)CPRI).

Existing solutions based on commercially available network interfaces or network cards do not allow the recording of auxiliary signals (e.g., the air interface time reference, such as reference time TRa). Therefore, it was up to now not possible to perform detailed symbol time calculations without a PTP slave and a corresponding timestamp. It is an advantage to display timing information inherent to the nature of transporting digital antenna samples (e.g., as radio data packets including IQ data, across a packet-based interface, such as a fronthaul (link and/or protocol)). The "deck of cards" approach improves the usability of the test device and/or the test system. Further benefits are a highly efficient RF slot-based split of the radio data packet timeline onto time windows. Further, an auxiliary signal, such as air interface time reference (TRa) is saved, as part of capture, and visualized with radio data packets. The visualization of RF symbol-based acceptable arrival time windows may be inter/extrapolated from the reference time TRa separately for each RF symbol. The shifting of visualized radio data packets according to the time Advance values allows to bring the visual plots to the same time domain (e.g., and to avoid confusion between, such as, O-RAN, fronthaul, and RF time domains). Further, radio data packet start and/or end timestamps may be taken into account (e.g., in visualizations to show actual data packet duration on the timeline and/or highlight where the end of the last radio data packet of a (application/transport fragmented) RF symbol might fall out of the acceptable time window). The highlighting of timing violations by using exclamation marks and/or striking colors (e.g., or any other way necessary) may help to gain attention of the user and steer the user to the error(s) and allowing direct and easy transition to next/previous error. The visualization of timing-multiplexing of different radio data packet streams from different antennas shows how data packet scheduling works and if the uplink and/or downlink operates reliably or at the edge. Further, the visualization of RF symbol assignments for downlink (DL), uplink (UL), and guard periods (GP) in time-division duplex (TDD) based LTE and 5G NR schemes is enabled.

FIG. 9 shows example acts according to a first embodiment. In a first act S1, a reference time TRa for one or more radio data packets that are received at an antenna interface of a first radio equipment is recorded. In a second act S2, a time window based on the reference time (e.g., based on a predetermined time delay of the first radio equipment and/or fronthaul transmission) is generated by the test device. In a third act S3, the one or more data packets are transmitted to a second radio equipment by the first radio equipment. In a fourth act S4, an arrival time at which the one or more radio data packets are received by the second radio equipment is recorded by the test device. In a fifth act S5, the arrival time with the time window in order to determine the timing accuracy of the one or more radio data packets is compared by the test device.

FIG. 10 show further example. In act S6, the reference time is generated based on a reference clock. The first radio equipment and the second equipment, and, for example, the test device are synchronized with respect to the reference clock. In act S7, for each RF (sub)frame boundary received at the antenna interface (Ra), a reference time at the antenna interface (Ra) is recorded. Further, a time window for each RF symbol in the RF (sub)frame may be generated based on the reference time. In act S8, a time window for each of a plurality of RF symbols is generated, where the radio data packets correspond to RF symbols of a RF slot and/or RF (sub)frame, and where the RF symbols are represented as IQ data.

FIG. 11 shows further example acts. In act S9, a time window is associated with each of the plurality of radio data packets. In act S10, the respective time window and the associated radio data packet are concurrently displayed (e.g., on a display screen). In act S11, it is indicated whether the associated radio data packet at least partially exceeds its respective time window.

FIG. 12 shows further acts S12, where radio data packets are successively arranged in chronological order received at the antenna interface and/or at the second radio equipment, and the time windows and the associated radio data packets of at least one RF slot are concurrently displayed in a first view.

FIG. 13 shows further example acts, where in act S13, the first view including the time windows and the radio data packets of a first RF slot and a second view including the time windows and the radio data packets of a second slot are displayed and, for example, switched between based on a first user input.

FIG. 14 shows further example acts, where in act S14, a first view including the time windows and the radio data packets of the first RF slot and a second view including at least one RF (sub)frames (e.g., in chronological order) are displayed, and, for example, switched between based on a second user input between. In the second view, it is indicated whether one of the associated radio data packets of a (sub)frame at least partially exceeds its respective the time window.

Figure 15:
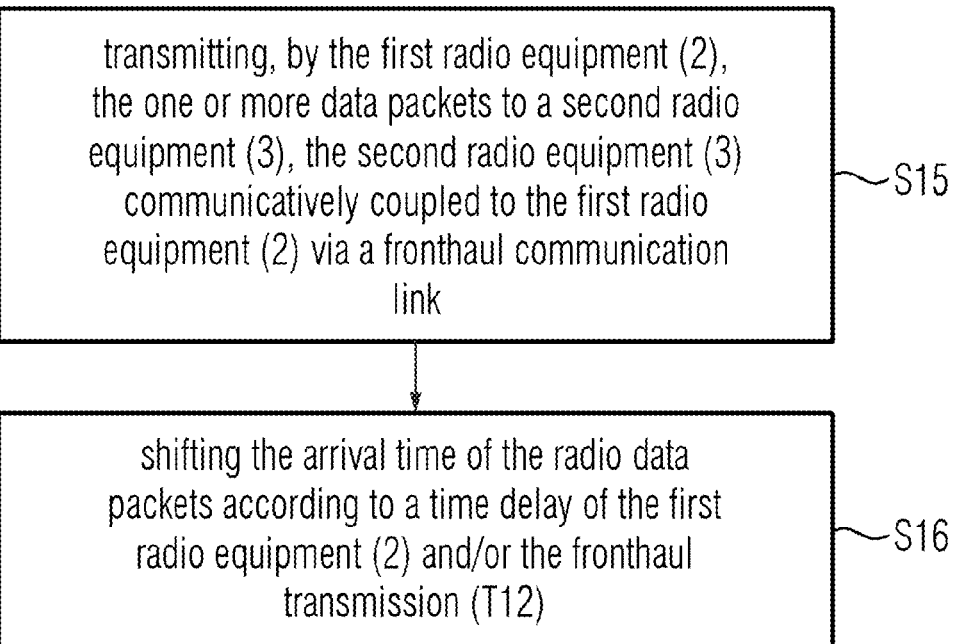

FIG. 15 shows further example acts. In act S15, the one or more data packets are transmitted by the first radio equipment to the second radio equipment. The second radio equipment is communicatively coupled to the first radio equipment via a fronthaul communication link and/or using a fronthaul communication protocol. In act S16, the arrival time of the radio data packets is shifted according to a time delay of the first radio equipment and/or a time delay of the fronthaul transmission.

A further embodiment includes: determining, based on the reference time, a RF symbol boundary, Tsym (e.g., for each RF symbol in a RF slot, RF subframe, and/or RF frame); and/or generating the time window W0, . . . , W13, based on the RF symbol boundary, for the one or more radio data packets representing the RF symbol (e.g., in the RF frame, RF subframe, or Rf slot).

A further embodiment includes: generating a time window W0, . . . , W13 for the one or more radio data packets 10, where the radio data packets 10 correspond to one or more RF symbols of a RF slot and/or RF (sub)frame, and where the RF symbols are represented as IQ data in the radio data packets.

A further embodiment includes: associating a time window W0, . . . , W13 with each of the plurality of radio data packets 10, and/or concurrently displaying (e.g., on a display screen) the respective time window W0, . . . , W13 and the associated radio data packet, and/or indicating whether the associated radio data packet at least partially exceeds its respective time window W0, . . . , W13.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining timing accuracy of one or more radio data packets, the method comprising:

recording, by a test device, a reference time for the one or more radio data packets received via an antenna interface of first radio equipment;

generating, by the test device, a time window based on the reference time;

transmitting, by the first radio equipment, the one or more radio data packets to second radio equipment;

recording, by the test device, an arrival time at which the one or more radio data packets are received by the second radio equipment;

determining, based on the reference time, a RF symbol boundary, preferably for each RF symbol in a RF slot, RF subframe, RF frame, or any combination thereof;

generating the time window based on the RF symbol boundary, for the one or more radio data packets representing the RF symbol, in the RF frame, the RF subframe, or the Rf slot; and comparing, by the test device, the arrival time with the time window, such that timing accuracy of the one or more radio data packets is determined.

2. The method of claim 1, further comprising:

generating the reference time based on a reference clock, wherein the first radio equipment and the second equipment, and preferably the test device, are synchronized with respect to the reference clock.

3. The method of claim 1, further comprising:

generating a time window for the one or more radio data packets, wherein the one or more radio data packets correspond to one or more RF symbols of a RF slot, RF (sub) frame, or RF slot and RF (sub) frame, and wherein the one or more RF symbols are represented as IQ data in the one or more radio data packets.

4. The method of claim 3, wherein the one or more radio data packets comprises a plurality of radio data packets, wherein the method further comprises:

associating a time window with each radio data packet of the plurality of radio data packets;

concurrently displaying, on a display screen, the respective time window and the associated radio data packet; and indicating whether the associated radio data packet at least partially exceeds the respective time window.

5. The method of claim 4, further comprising:

successively arranging radio data packets of the plurality of radio data packets in chronological order received at the antenna interface, at the second radio equipment, or at the antenna interface and at the second radio equipment; and concurrently displaying the time windows and the associated radio data packets of at least one RF slot in a first view.

6. The method of claim 5, further comprising:

displaying and switching, based on a first user input, between the first view comprising the time windows and the radio data packets of a first RF slot, and a second view comprising the time windows and the radio data packets of a second slot.

7. The method of claim 6, further comprising:

displaying and switching, based on a second user input, between the first view comprising the time windows and the radio data packets of the first RF slot and a third view comprising at least one RF subframe in chronological order; and indicating, in the second view, whether one of the associated radio data packets of a (sub) frame at least partially exceeds the respective time window.

8. The method of claim 1, wherein transmitting, by the first radio equipment, the one or more radio data packets to the second radio equipment comprises transmitting, by the first radio equipment, the one or more radio data packets to the second radio equipment communicatively coupled to the first radio equipment via a fronthaul communication link.

9. The method of claim 8, further comprising:

shifting the arrival time of the one or more radio data packets according to a time delay of the first radio equipment, the fronthaul transmission, or the first radio equipment and the fronthaul transmission.

10. The method of claim 1, further comprising testing radio equipment under test, verifying the radio equipment under test, validating the radio equipment under test, or any combination thereof using the method.

11. A test system comprising:

a test device configured to determine timing accuracy of one or more radio data packets, the test device being configured to determine the timing accuracy of the one or more radio data packets comprising the test device being configured to:

record a reference time for the one or more radio data packets received via an antenna interface of first radio equipment;

generate a time window based on the reference time;

transmit the one or more radio data packets to second radio equipment;

record an arrival time at which the one or more radio data packets are received by the second radio equipment;

determine, based on the reference time, a RF symbol boundary, preferably for each RF symbol in a RF slot, RF subframe, RF frame, or any combination thereof;

generate the time window based on the RF symbol boundary, for the one or more radio data packets representing the RF symbol, in the RF frame, the RF subframe, or the Rf slot; and compare the arrival time with the time window, such that timing accuracy of the one or more radio data packets is determined.

\* \* \* \* \*